US010610987B2

(12) United States Patent
Ogata et al.

(10) Patent No.: US 10,610,987 B2
(45) Date of Patent: Apr. 7, 2020

(54) CLAMPING BAND ATTACHMENT METHOD AND CLAMPING BAND ATTACHMENT APPARATUS

(71) Applicant: NTN CORPORATION, Osaka (JP)

(72) Inventors: Yuki Ogata, Shizuoka (JP); Masataka Morikawa, Shizuoka (JP); Shoutarou Muramatsu, Shizuoka (JP)

(73) Assignee: NTN CORPORATION, Osaka (JP)

( * ) Notice: Subject to any disclaimer, the term of this patent is extended or adjusted under 35 U.S.C. 154(b) by 28 days.

(21) Appl. No.: 15/764,966

(22) PCT Filed: Sep. 2, 2016

(86) PCT No.: PCT/JP2016/075913
§ 371 (c)(1),
(2) Date: Mar. 30, 2018

(87) PCT Pub. No.: WO2017/056852
PCT Pub. Date: Apr. 6, 2017

(65) Prior Publication Data
US 2018/0200849 A1    Jul. 19, 2018

(30) Foreign Application Priority Data

Oct. 1, 2015    (JP) .................................. 2015-195960

(51) Int. Cl.
*B23P 19/08* (2006.01)
*B23P 19/12* (2006.01)
(Continued)

(52) U.S. Cl.
CPC ........... *B23P 19/084* (2013.01); *B23P 19/086* (2013.01); *F16B 2/08* (2013.01); *F16D 3/84* (2013.01); *B23P 2700/11* (2013.01); *F16D 3/845* (2013.01)

(58) Field of Classification Search
CPC ....... B23P 19/084; B23P 19/086; B23P 19/12; B23P 19/107; B23P 21/002;
(Continued)

(56) References Cited

U.S. PATENT DOCUMENTS 9,427,837 B2 *  8/2016  Hatano ................. B23P 19/086
2003/0126737 A1 *  7/2003  Yamamoto .............. B23P 19/08
29/706

(Continued)

FOREIGN PATENT DOCUMENTS

JP        6-39651        2/1994
JP        7-251336       10/1995
JP        2001-219960    8/2001

OTHER PUBLICATIONS

International Preliminary Report on Patentability and Written Opinion of the International Searching Authority dated Apr. 3, 2018 in International (PCT) Application No. PCT/JP2016/075913.
(Continued)

*Primary Examiner* — Bayan Salone
(74) *Attorney, Agent, or Firm* — Wenderoth, Lind & Ponack, L.L.P.

(57) ABSTRACT

In a state where a pair of protrusion portions of a ring portion is clamped by front end engagement portions of a pair of claw members (71) (72), the front end engagement portions of the pair of claw members are swung in a direction approaching each other about a pivotal supporting portion (80). A sliding body (77) slides with the contact of the front end engagement portion to the ring portion or to the protrusion portion thereof so as to follow a radial and circumferential displacement of the protrusion portion accompanying a diameter reduction of the ring portion.

8 Claims, 17 Drawing Sheets

(51) Int. Cl.
    *B23P 19/10*     (2006.01)
    *B23P 21/00*     (2006.01)
    *F16D 3/84*     (2006.01)
    *F16B 2/08*     (2006.01)

(58) Field of Classification Search
    CPC ........ B23P 2700/11; F16D 3/84; F16D 3/845; F16B 2/08; Y10T 29/49872; Y10T 29/4978; Y10T 29/49772
    See application file for complete search history.

(56) References Cited

U.S. PATENT DOCUMENTS

| | | | | |
|---|---|---|---|---|
| 2003/0126738 A1* | 7/2003 | Yamamoto | ............... | B23P 19/08 29/706 |
| 2014/0115857 A1* | 5/2014 | Hatano | ................ | B23P 19/086 29/407.1 |
| 2016/0325389 A1 | 11/2016 | Hatano et al. | | |

OTHER PUBLICATIONS

International Search Report (ISR) dated Oct. 4, 2016 in International (PCT) Application No. PCT/JP2016/075913.
Extended European Search Report dated Apr. 18, 2019 in corresponding European Patent Application No. 16851028.7.

\* cited by examiner

CLAMPING BAND ATTACHMENT METHOD AND CLAMPING BAND ATTACHMENT APPARATUS

TECHNICAL FIELD

The present invention relates to a clamping band attachment method and a clamping band attachment apparatus.

BACKGROUND ART

A boot is attached, to a constant velocity universal joint used for transmission of power in an automobile or various industrial machines, in order to prevent foreign matter such as dust from entering the inside of the joint and to prevent leakage of grease sealed in the joint. As materials of the boot for a constant velocity universal joint, a silicone material a CR material (chloroprene), a VAMAC material (ethylene-acrylic rubber), a CM material (chlorinated polyethylene), and the like are known.

The boot for the constant velocity universal joint is mounted and fixed to the constant velocity universal joint by using a fastening band. An example of the band is a low-profile band described in Patent literature 1 or the like. This band is configured by rolling a belt-shaped member 1 as illustrated in FIG. 17 into a ring shape as illustrated in FIGS. 18A, 18B, and 18C. The band is externally fitted to and mounted on a mounting portion of the boot.

On one end side of the belt-shaped member 1, a protrusion portion 2 protruding toward a front surface side, a claw portion 3 located close to the protrusion portion 2, and protrusion, portions 4, 5 located close to the claw portion 3 and protruding toward the front, surface side are provided. On the other end side of the belt-shaped member 1, an engaging hole 6 having a rectangular shape and an elongated hole 7 located close to the engaging hole 6 are provided. In addition, the elongated hole 7 is provided with a protrusion portion 8 that protrudes toward the front surface side on the side opposite to the engaging hole 8.

In a method of fixing the boot using this band, first, the band is rounded into a ring shape so that the protrusion portion 2 fits in the elongated hole 7 as illustrated in FIG. 18A. That is, a ring portion 9 is formed, and the ring portion 9 is externally fitted to a band mounting portion of the boot in a loosely fitted state. In this case, the protrusion portion 2 is placed on a side closer to the engaging hole 6 in the elongated hole 7.

Thereafter, the protrusion portion 8 and the protrusion portion 2 are sandwiched by a tool 10 (see FIGS. 19A and 19B) to be described later, and the tool 10 is operated to bring the protrusion portion 2 and the protrusion portion 8 relatively closer to each other as illustrated in FIG. 18B. As a result, the diameter of the ring portion 9 gradually decreases. Then, as illustrated in FIG. 18C, in a state where the protrusion portion 2 and the protrusion portion 8 are in contact with each other, the protrusion portion 5 is engaged with the engaging hole 6, and the protrusion portion 4 is engaged with the side closer to the engaging hole 6 of the elongated hole 7. As a result, this band clamps the band mounting portion of the boot. Therefore, the boot can be fixed to an outer joint member of the constant velocity universal joint or a shaft fitted into an inner joint member of the constant velocity universal joint.

CITATION LIST

Patent Literature

Patent Literature 1: JP 2001-219960 A

SUMMARY OF THE INVENTION

Technical Problems

Incidentally, as described above, in the case of bringing protrusion portions separated at a predetermined interval along the circumferential direction closer to each other by the tool 10 as illustrated in FIGS. 19A and 19B, first, the state illustrated in FIG. 19A is set. That is, for a band mounting portion 11a of a boot 11, a ring portion 12 is formed by rounding the belt-shaped member 1. Thus, the protrusion portions 2, 8 arranged at a predetermined interval along the circumferential direction are protruded outward in the radial direction.

In addition, the tool 10 includes a pair of claw members 13, 13. In this case, the claw members 13, 13 swing about a pivotal supporting shaft and swing along an arc (locus) 15.

That is, in the case of swinging the claw members 13, 13 to reduce the interval between the protrusion portions 2, 8 from an initial state illustrated in FIG. 19A, engagement portions 13a, 13a of the claw members 13, 13 swing along arrows S due to the arc 15. Therefore, the engagement portions 13a, 33a are brought close to each other in directions of arrows M and also brought close to the ring portion 12 in directions of arrows N. Therefore, due to the diameter reduction of the ring portion 12, the protrusion portions 2, 8 are displaced from the arc 15.

Accordingly, there is a possibility that the protrusion portions 2, 8 cannot be pressed by the engagement portions 13a, 13a that swing. In such a case, there is a possibility that the ring portion 12 cannot be reduced in diameter, or the engagement portions 13a, 13a will come into contact with the ring portion 12, and the ring portion 12 will be deformed. For this reason, it is impossible to carry out stable diameter reduction work. Therefore, conventionally, it is necessary for a worker to adjust the positions of the claw members so as not to bring the engagement portions 13a, 13a into contact with the ring portion 12, and this adjustment is performed manually by a skilled worker.

An object of the present invention is to provide a clamping band attachment method and a clamping band attachment apparatus capable of reducing the diameter of a fastening band stably even by a beginner without being skilled and of fixing a boot to a boot mounting portion.

Solution to Problems

The clamping hand attachment method according to the present invention includes rounding a belt-shaped member in a ring shape and forming a ring portion which is externally fated to a band mounting portion of a boot; the ring portion being formed with a pair of protrusion portions separated at a predetermined pitch along a circumferential direction; and bringing the pair of protrusion portions close to each other in the circumferential direction so as to reduce a diameter of the ring portion. In a state where the pair of protrusion portions of the ring portion are clamped by front end engagement portions of a pair of claw members, a sliding body slides with contact of the front end engagement portion to one of the ring portion and the pair of protrusion portions of the ring portion so as to follow a radial and circumferential displacement of the pair of protrusion portions accompanying a diameter reduction of the ring portion while the front end engagement portions of the pair of claw members are swung in a direction approaching each other about a pivotal supporting portion.

In a state where the pair of protrusion portions of the ring portion is clamped by the front end engagement portions of the pair of claw members, if the front end engagement portions of the pair of claw members are swung in the direction approaching each other about the pivotal supporting portion, the ring portion is reduced in diameter. At this time, the protrusion portions are displaced in the radial and circumferential directions, accompanying the diameter reduction of the ring portion. However, it is possible for the sliding body having the front end engagement portion to slide so as to follow the displacements of the ring portion.

The sliding bodies of the pair of claw members can be set so as to slide independently. By setting the sliding bodies in this manner, it is possible for the sliding bodies to flexibly follow the outer diameter of the ring portion without being affected by variation in the shape of the ring portion.

A clamping band attachment apparatus according to the present invention is a clamping band attachment apparatus which rounds a belt-shaped member in a ring shape and forms a ring portion externally fitted to a band mounting portion of a boot, the ring portion being formed with a pair of protrusion, portions separated at a predetermined pitch along a circumferential direction, and brings the pair of protrusion portions close to each other in the circumferential direction so as to reduce a diameter of the ring portion. The clamping band attachment apparatus includes: clamping means which has a pair of claw members that swing in a direction in which front end engagement portions of the pair of claw members approach and separate from each other about a pivotal supporting portion; reciprocating means which reciprocates the pair of claw members of the clamping means in a direction approaching and separating from the band mounting portion of the boot; and swinging means which swings the pair of claw members of the clamping means in a direction approaching and separating from each other. The pair of claw member includes a claw member main body, and a sliding body formed with each of the front end engagement portions. In a state where the pair of protrusion portions of the ring portion are clamped by the front end engagement portions of the pair of claw members, the sliding body formed with each of the front end engagement portions is slidably attached to the claw member main body as to follow a radial and circumferential displacement of each of the pair of protrusion portions accompanying a diameter reduction of the ring portion while the front end engagement portions of the pair of claw members are swung in the direction approaching each other about the pivotal supporting portion.

According to the clamping band attachment apparatus of the present invention, the claw members can approach and separate from the band mounting portion of the boot via the reciprocating means. In addition, the claw members can be swung in the direction approaching and separating from each other via the swinging means. Therefore, it is possible to bring the pair of claw members into an open state where the pair of claw members is separated from each other, and to bring the pair of claw members close to the band mounting portion. Then, the pair of protrusion portions can be clamped by the front end engagement portions of the pair of claw members. In this state, if the claw members are brought close to each other, the diameter of the ring portion can be reduced. At this time, the protrusion portions are displaced in the radial and circumferential directions, accompanying the diameter reduction of the ring portion. However, it is possible for the sliding body having the front end engagement portion to slide so as to follow the displacements of the ring portion.

It is preferable that the sliding body is attached to the claw member main body via an elastic member that elastically presses the sliding body toward a front end side to bring the sliding body in a forward state in a free state, and allows the sliding body to move backward upon contact with one of the ring portion and each of the protrusion portions of the ring portion in a state where the front end engagement portions are brought close to each other. With such a configuration, followability of the front end engagement portion with reaped to the radial and circumferential displacement of the protrusion, portions is stabilized.

The swinging means may include a wedge member which expands and reduces the interval between the front end engagement portions of the pair of claw members by reciprocating in the axial direction between the pair of claw members on the rear end side with respect to the pivotal supporting shaft. With this configuration, by inserting the wedge member between the pair of claw members on the rear end side, it is possible to bring about a closed state where the interval between the front end engagement portions is reduced. By pulling out the wedge member from between the pair of claw members on the rear end side, it is possible to bring about the open state where the interval between the front end engagement portions is increased. In addition, by inserting a wedge member between the pair of claw members on the rear end side, it is possible to bring about the open state where the interval between the front end engagement portions is increased. By pulling out the wedge member from between the claw members on the rear end side, it is possible to bring about the closed state where the interval between the front end engagement portions is reduced.

Advantageous Effects of Invention

In the present invention, it is possible to reduce the diameter of the ring portion without using a control mechanism or the like and without performing manual work by a worker for the radial and circumferential displacement of the protrusion portions, and to stably mount the boot on the boot mounting portion. Therefore, work efficiency can be improved and cost can be reduced.

By setting the sliding bodies of the pair of claw members so as to slide independently, it is possible to flexibly follow the outer diameter of the ring portion without being affected by variation in the shape of the ring portion. It is possible to stably reduce the diameter of the ring portion without forming the ring portion formed by rolling the belt shaped member into a ring shape with high accuracy.

DESCRIPTION OF EMBODIMENTS

Figure 1:
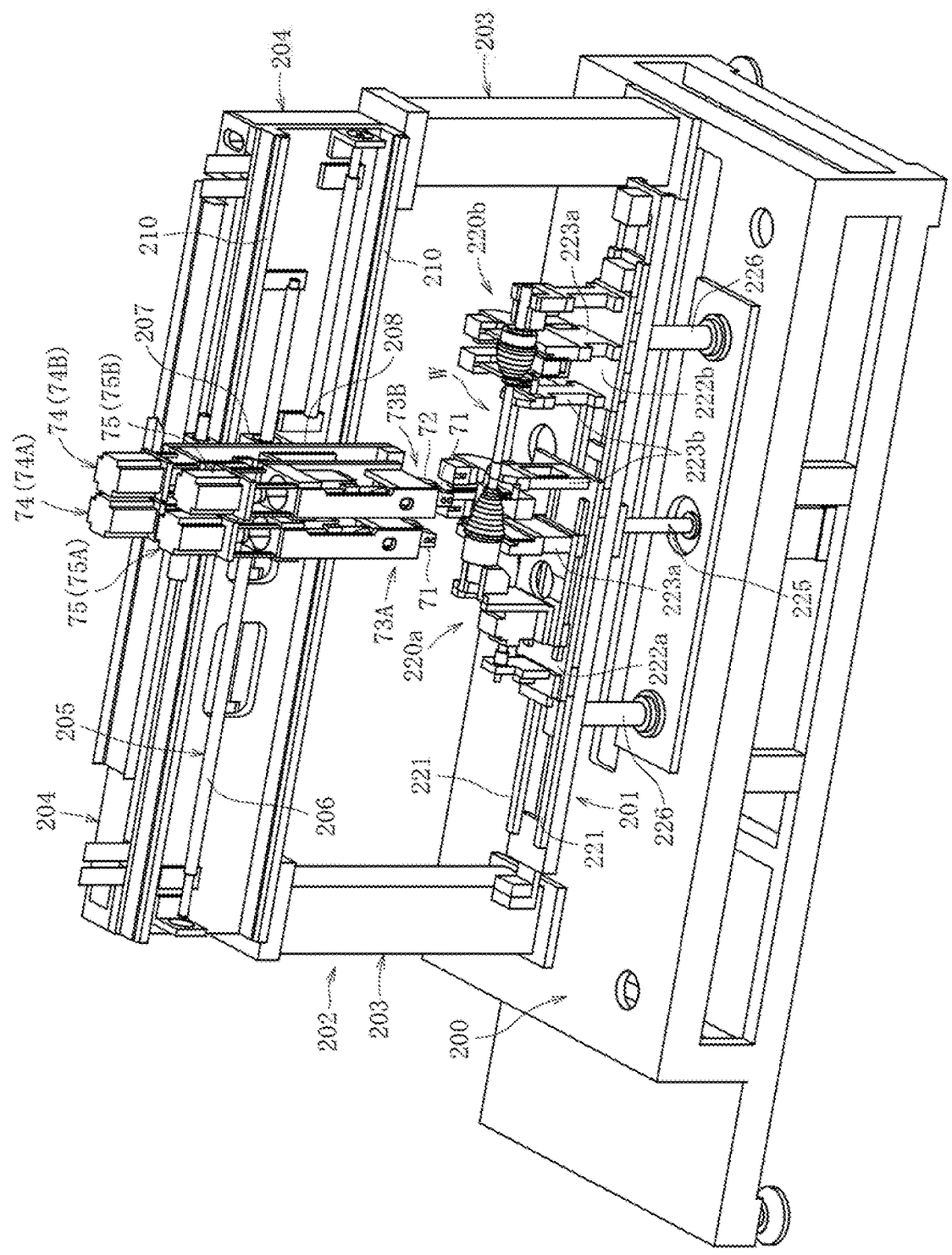
FIG. 1 is a perspective view of a clamping band attachment apparatus according to the present invention.

An embodiment of the present invention will be described below with reference to FIGS. 1 to 16. FIG. 16 illustrates a drive shaft on which a fastening band is mounted using a band attachment apparatus of the present invention. The drive shaft includes a fixed-type constant velocity universal joint 21, a sliding-type constant velocity universal joint 22, and a shaft 23 connecting the constant velocity universal joints. In the example illustrated in FIG. 16, a Birfield constant velocity universal joint is used as the fixed type constant velocity universal joint 21, and a tripod constant velocity universal joint is used as the sliding-type constant velocity universal joint 22.

The feed-type constant velocity universal joint 21 includes: an outer joint member 26 having a plurality of tracks 24 extending axially and formed on an inner spherical surface 25; an inner joint member 29 having a plurality of tracks 27 extending axially and formed on an outer spherical surface 28; a plurality of balls 30 interposed between the tracks 24 of the outer joint member 26 and the tracks 27 of the inner joint member 29 to transmit torque; and a cage 31 interposed between the inner spherical surface 25 of the outer joint member 26 and the outer spherical surface 28 of the inner joint member 29 to hold the balls.

The sliding-type constant velocity universal joint 22 includes: an outer joint member 33 which has three grooves 32 extending in the axial direction on the inner periphery thereof, and roller-ring guide surfaces 32a facing each other and formed on an inner side wall of each groove 32; a tripod member 35 which includes three leg shafts 34 protruding in the radial direction and serving as an inner joint member; and a roller ring 36 which is rotatably supported by the leg shaft 34, is rotatably inserted into the groove 32 of the outer joint member 33 so as to freely roll, and serves as a torque transmission member. In this case, the roller ring 38 is externally fitted to the outer circumferential surface of the leg shaft 34 via a plurality of rollers 37 arranged along the circumferential direction. Note that the tripod member 35 includes a boss portion 38 and the leg shafts 34 extending, radially from the boss portion 38.

Male splines 23a, 28b are formed at both end portions of the shaft 23. The male spline 23a on one side is fitted into the inner joint member 29 of the fixed-type constant velocity universal joint 21, and the male spline 23b on the other side is fitted into the tripod member 35 of the sliding-type constant velocity universal joint 22. A female spline 40 is formed in an axial hole of the inner joint member 29. The male spline 23a on the one side of the shaft 23 is fitted into the axial hale of the inner joint member 29 and meshes with the female spline 40. The male spline 23b on the other side of the shaft 23 is fitted into an axial hole of the boss portion 38 of the tripod member 35 and meshes with a female spline 40 of the axial hole.

A boot 45 (45A) for sealing an opening of the outer joint member 28 is attached to the fixed-type constant velocity universal joint 21. A boot 45 (45B) for sealing an opening of the outer joint member 33 is attached to the sliding-type constant velocity universal joint 22. Each of the boots 45A, 45B includes a large-diameter band mounting portion 46a, a small-diameter band mounting portion 46b, and a bellows portion 46c constituting a bent portion connecting the large-diameter band mounting portion 48a and the small-diameter band mounting portion 46b. The large-diameter band mounting portions 46a of the boots 45A, 45B are clamped and feed by fastening bands 50 (50A, 50B) at boot mounting portions 47, 47 formed on the outer circumferential surfaces on the opening sides of the outer joint members 26, 33, respectively. The small diameter band mounting portions 46b of the boots 45A, 45B are clamped and fixed by fastening bands 50 (50A, 50B) at predetermined sections (boot, mounting portions 47, 47) of the shaft 23.

Figure 12:
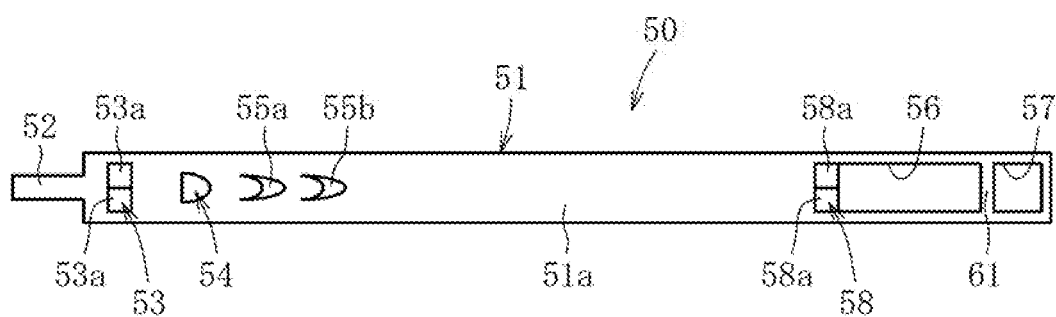
FIG. 12 is a plan view illustrating a fastening band.
Figure 13:
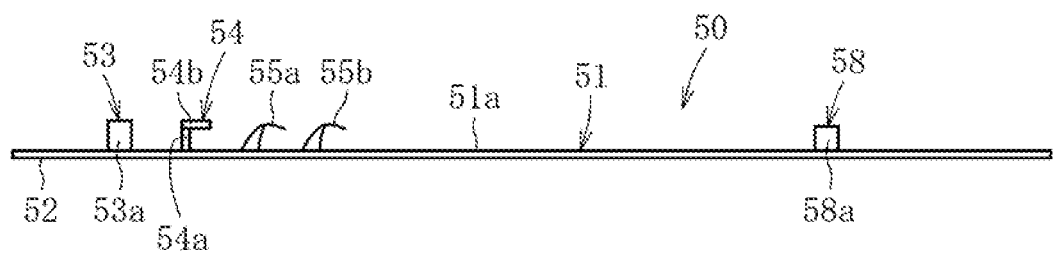
FIG. 13 is a side view of the fastening band illustrated in FIG. 12.
Figure 14:
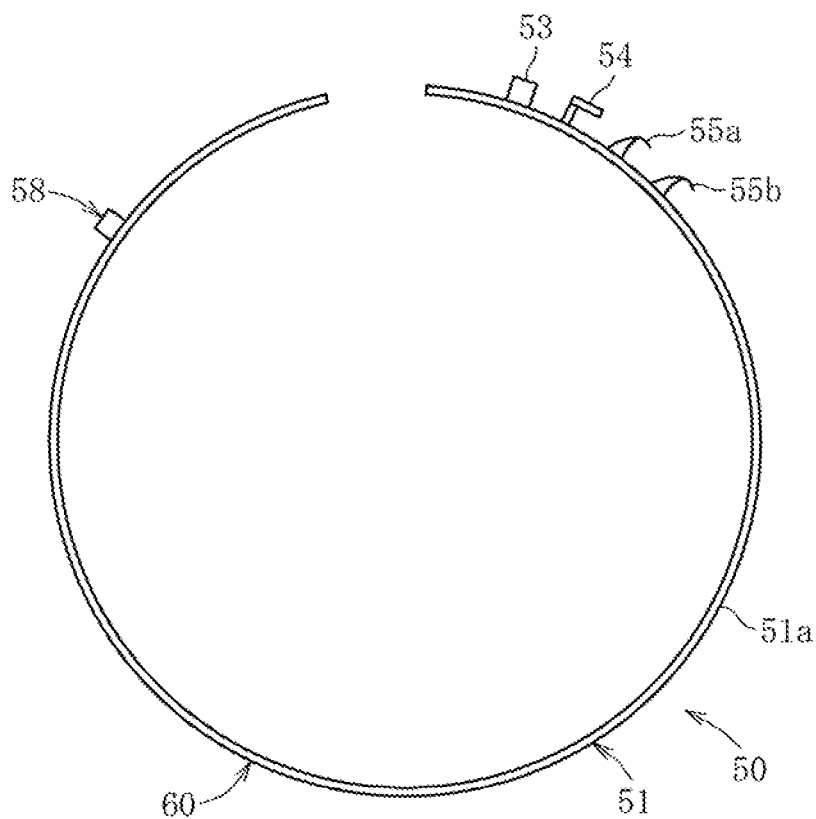
FIG. 14 is a transverse cross-sectional view of a material before being drawn in a state where the fastening band illustrated in FIG. 12 is rounded in a ring shape.

The fastening band 50 is formed of a belt-shaped member 51 as illustrated in FIGS. 12 to 14. The belt-shaped member 51 made of metal has a narrow portion 52 formed on one end side thereof and a protrusion portion 53 provided near the narrow portion 52 and protruding toward a front surface 51a side. Furthermore, a protrusion portion 54 and engaging pieces 55a, 55b projecting toward the front surface 51a side are provided on a protrusion portion 53 side. In addition, an elongated hole 58 having a rectangular shape and an engaging hole 57 having a square shape are provided on the other end side of the belt-shaped member 51. A protrusion portion 58 protruding toward the front surface 51a side is provided on the side opposite to the engaging hole 57 of the elongated hole 56 having a rectangular shape.

The protrusion portion 53 and the protrusion portion 58 are constituted of triangular bodies configured of a pair of inclined pieces 58a, 53a, 58a, 58a, respectively. The protrusion portion 54 is configured of an upright piece 54a erected and protruding from the front surface 51a of the belt-shaped member 51, and a parallel piece 54b extending substantially parallel to the belt-shaped member 51 from the upright piece 54a. In addition, each of the engaging pieces 55a, 55b is formed in a hook shape. Note that, for example, aluminum, stainless steel, or the like can be used as the material of the fastening band 50; however, the material is not limited to them. That is, it is possible to select a material which has rigidity enabling clamping of the large-diameter portion 46a and the small-diameter portion 46b of the boot 45 and capable of maintaining this state, and which hardly deteriorates in a use environment, or the like of this constant velocity universal joint.

A method of clamping the band 50 configured as described above will be described. First, as illustrated in FIG. 14, a ring portion 60 is formed by rounding the fastening band 50 into a ring shape. In this rounding, the fastening band 50 is rounded such that the one end side where the protrusion portions 53, 54 and the engaging pieces 55a, 55b are provided is located at an inner side than the other end side where the elongated hole 56 (see FIG. 12) and the engaging hole 57 (see FIG. 12) are provided. Then, as a diameter-reduced initial state, the protrusion portion 53 on the one end side is fitted into the elongated hole 56 from the inner side. In this case, the protrusion portion 53 is positioned closer to the engaging hole 57 in the elongated hole 58.

Then, the protrusion portion 53 and the protrusion portion 58 are brought close to each other by using a band attachment apparatus for the constant velocity universal joint according to the present invention. As a result, the ring portion 60 configured of the belt-shaped member 51 is reduced in diameter. That is, since the protrusion portion 53 is provided on the one end side and the protrusion portion 58 is provided on the other end side, the ring portion 60 is reduced in diameter by bringing the protrusion portion 53 and the protrusion portion 58 close to each other.

Then, the engaging piece 55a is engaged with the elongated hole 56, and the engaging piece 55b is engaged with the engaging hole 57. That is, the pair of engaging pieces 55a, 55b clamps a partition portion 61 between the elongated hole 56 and the engaging hole 57. As a result, this diameter-reduced state can be maintained.

Figure 2:
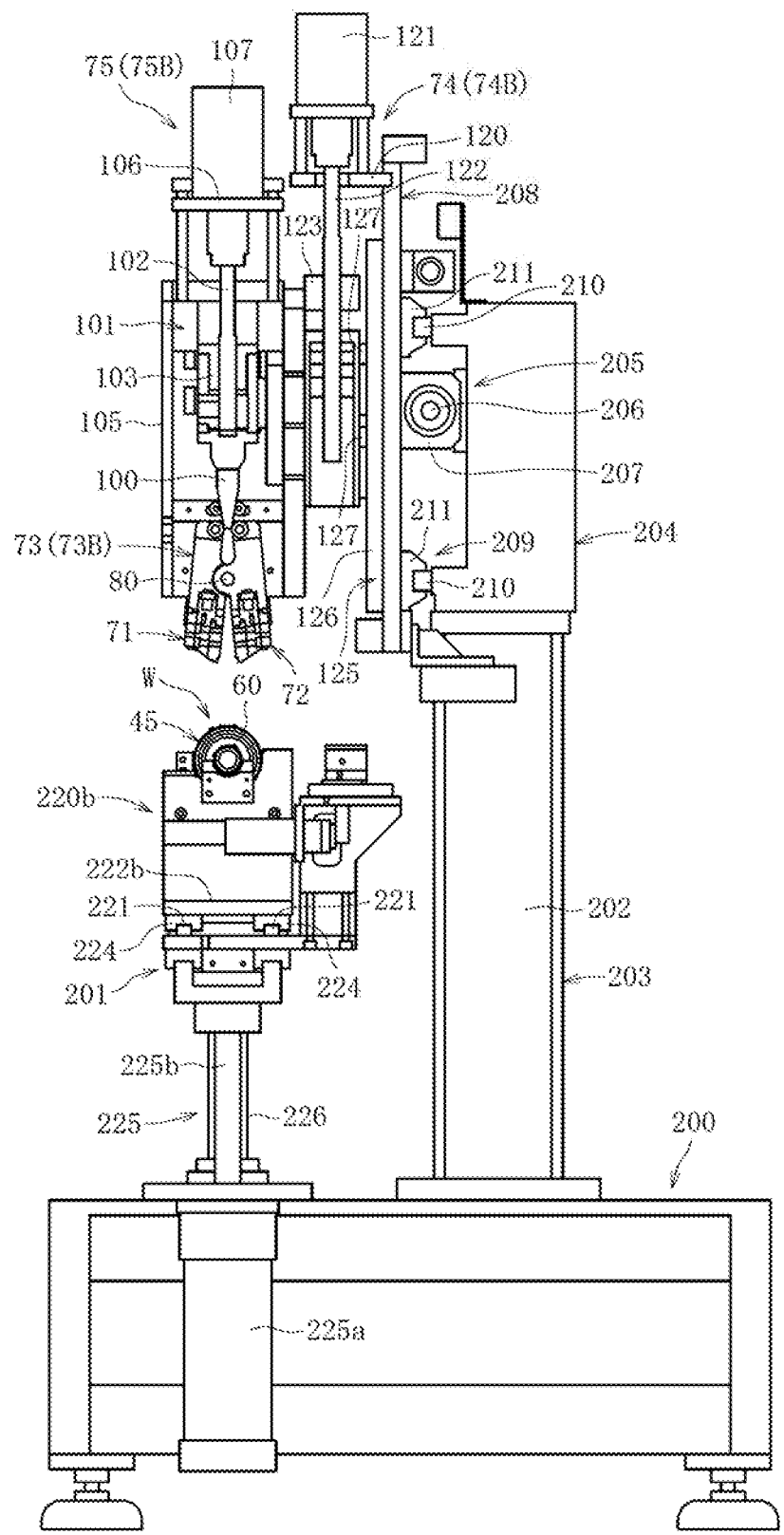
FIG. 2 is a side view of the clamping band attachment apparatus illustrated in FIG. 1.

Next, a clamping band attachment apparatus according to the present invention will be described. As illustrated in FIGS. 1, 2, and the like, this clamping band attachment apparatus includes: a pair of clamping means 73A, 73B each having a pair of claw members 71, 72; a pair of reciprocating means 74 (74A, 74B) which reciprocate the pair of claw members 71, 72 of each of the clamping means 73A, 73B in a direction approaching and separating from the band mounting portion (the large-diameter portion 48a or the small-diameter portion 46b) of the boot 45; and swinging means 75 (75A, 75R) which swing the claw members 71, 72 of the clamping means 73 (73A, 73B) in a direction approaching and separating from each other.

As illustrated in FIGS. 5 to 9B, the claw members 71, 72 swing in directions of arrows A, B about a pivotal supporting portion (pivotal supporting shaft) 80. That is, each of the claw members 71, 72 has a claw member main, body 78 and a sliding body 77 in which a front end engagement, portion 71a or 72a is formed. The claw member 71 on one side has a protruding rib 78 for pivotal support which is provided substantially at the center in the longitudinal direction on the inner surface (surface facing the claw member 72 on the other side) of the claw member main body 76. The claw member 72 on the other side has a pair of protruding ribs 79, 79 which sandwich the protruding rib 78 and are provided on the inner surface (surface facing the claw member 71 on the one side) of the claw member main body 76. Through holes are provided in the protruding rib 78 and the protruding ribs 79, 79, and the pivotal supporting shaft 80 is fitted into the through holes. As a result, the claw members 71, 72 can swing in the directions of arrows A, B about the pivotal supporting portion (pivotal supporting shaft) 80.

The sliding body 77 has a first block body 81 constituting the front end engagement portion 71a (72a), and a second block body 82 integrated with the first block body 81. The second block body 82 has a cutout portion 83 in which the first block body 81 is fitted, and a projecting portion 84 fitted in a recessed portion 85 provided in the claw member main body 76. The claw member main body 78 is provided with a cutout portion 76a in which the sliding body 77 is fitted, and the recessed portion 85 is formed in the cutout portion 76a.

The first block body 81 and the second block body 82 are integrated via a bolt member, not illustrated. That is, a screw hole 88 is provided in the first block body 81, and a through hole 87 in the second block body 82 through which the bolt member is inserted is provided. In addition, the claw member main body 78 is provided with a through hole 88 corresponding to the through hole 87 of the second block body 82. Therefore, by inserting the bolt member (not illustrated), through the through hole 88 into the through hole 87 and screwing the bolt member in the screw hole 86, the first block body 81 and the second block body 82 are integrated.

The sliding body 77 can reciprocate along the axial direction of the claw member main body 78 in a state of being fitted in the cutout portion 76a of the claw member main body 76. In this case, a pin member 89 is provided on a claw member main body 76 side, and an elongated hole 90 for guide is provided in the second block body 82 of the sliding body 77. The pin member 89 is fitted into the elongated hole 90 to regulate sliding length.

Figure 8:
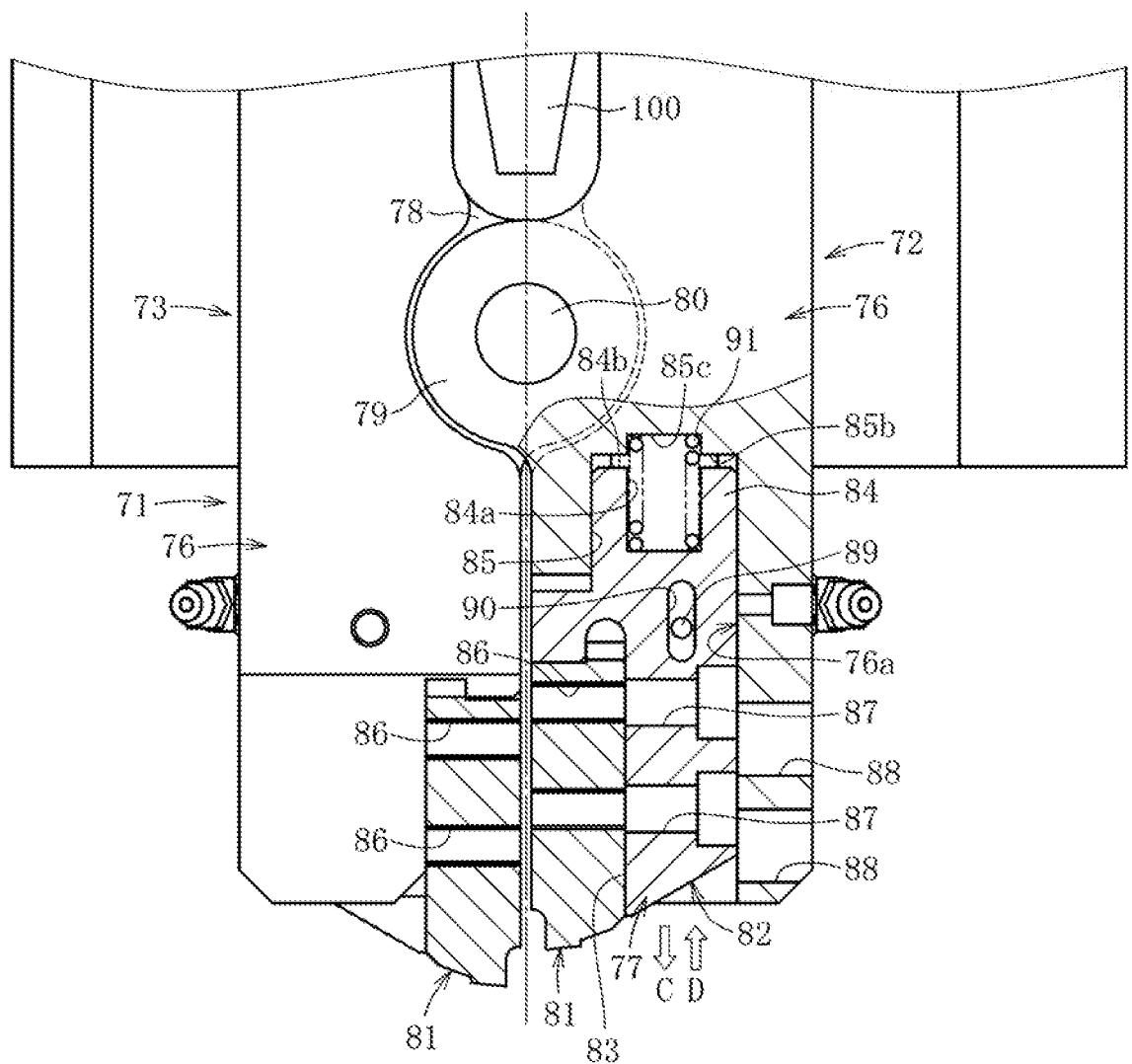
FIG. 8 is an enlarged view illustrating a pushed-up state of the sliding body of the clamping band attachment apparatus illustrated in FIG. 1.

A recessed portion 84a is provided in the projecting portion 84 of the second block body 82. A recessed portion 85c is provided in a bottom surface 85b of the recessed portion 85 of the cutout portion 76a of the claw member main body 76. An elastic member 91 configured of a coil spring is fitted in the recessed portion 84a and the recessed portion 85c. For this reason, normally (in a free state), due to elastic force of the elastic member 91, the sliding body 77 is pressed in a direction of arrow C toward a front end side, and the pin member 89 is positioned at the upper end of the elongated hole 90. Sliding of the sliding body 77 further in the direction of arrow C is restricted. If the sliding body 77 is pushed up in a direction of arrow D against the elastic force of the elastic member 91 from the state illustrated in FIGS. 5 to 7, the sliding body 77 slides in the direction of arrow D as illustrated in FIG. 8. In this case, the sliding body 77 slides in the direction of arrow D either until an end surface 84b of the projecting portion 84 of the second, block body 82 abuts against the bottom surface 85b of the recessed portion 85 of the cutout portion 76a of the claw member main body 76, or until the pin member 80 is positioned at the lower edge of the elongated hole 90.

The swinging means 75 includes a wedge member 100 and a vertical movement mechanism 101 (see FIG. 2 and the like) which vertically moves the wedge member 100. As illustrated in FIG. 8 and the like, the wedge member 100 has tapered surfaces 100a, 100b provided at a lower part thereof in order to make the wedge member 100 tapered toward the lower end. As illustrated in FIG. 2, the vertical movement mechanism 101 is configured of a screw shaft mechanism having a screw shaft 102 and a nut member 103 screwed to the screw shaft 102. In this ease, the screw shaft 102 is rotated about the axis thereof by a driving motor (for example, a servomotor) 107 supported by a supporting member 106 of a vertically sliding frame body 105.

Therefore, when the driving motor 107 is driven to rotate, the screw shaft 102 rotates around the axis thereof, and the nut member 103 vertically moves while being guided by the vertically sliding frame body 105. The wedge member 100 moves vertically in conjunction with vertical movement of the nut member 103.

Figure 3:
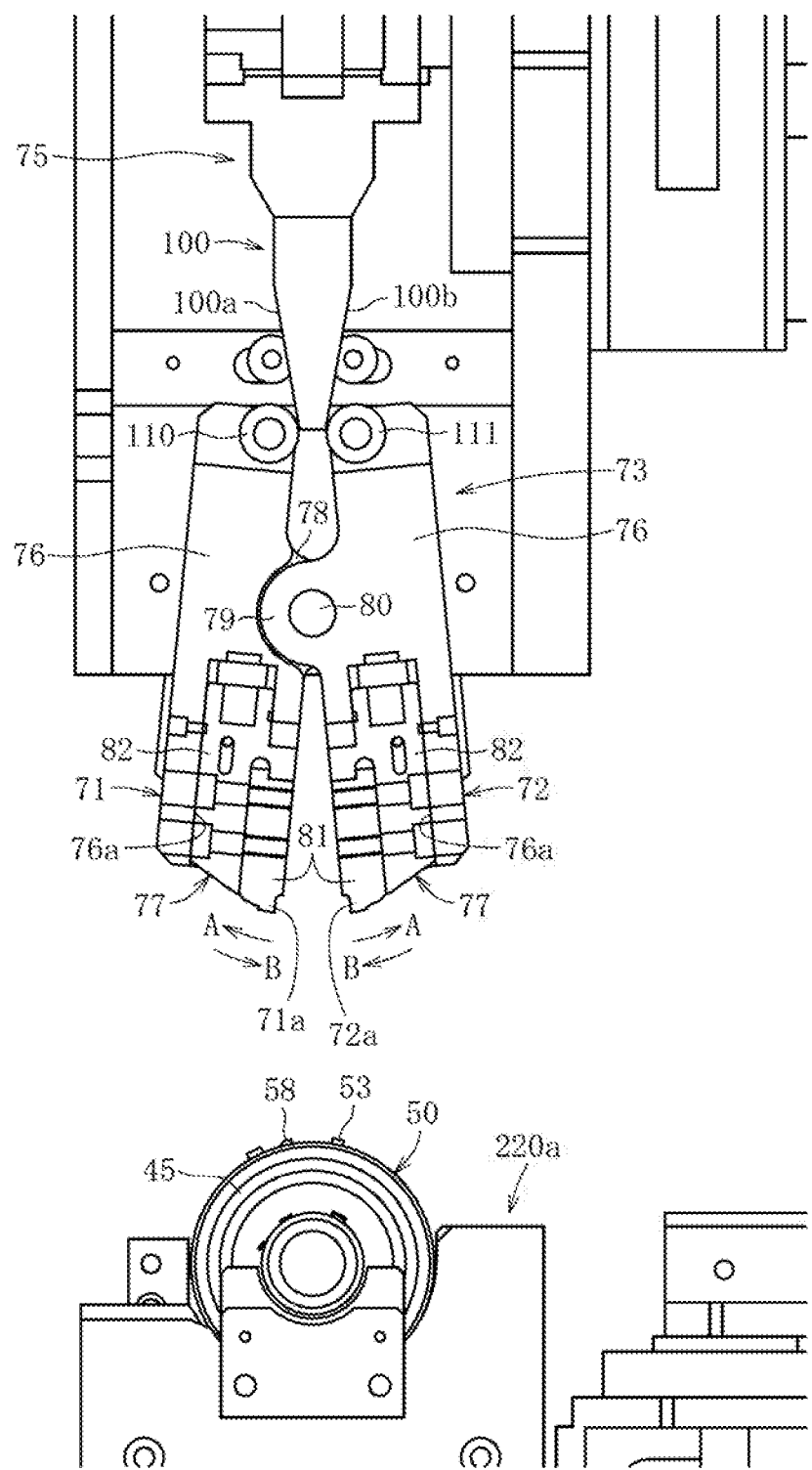
FIG. 3 is an enlarged side view of a main part of the clamping band attachment apparatus illustrated in FIG. 1.
Figure 5:
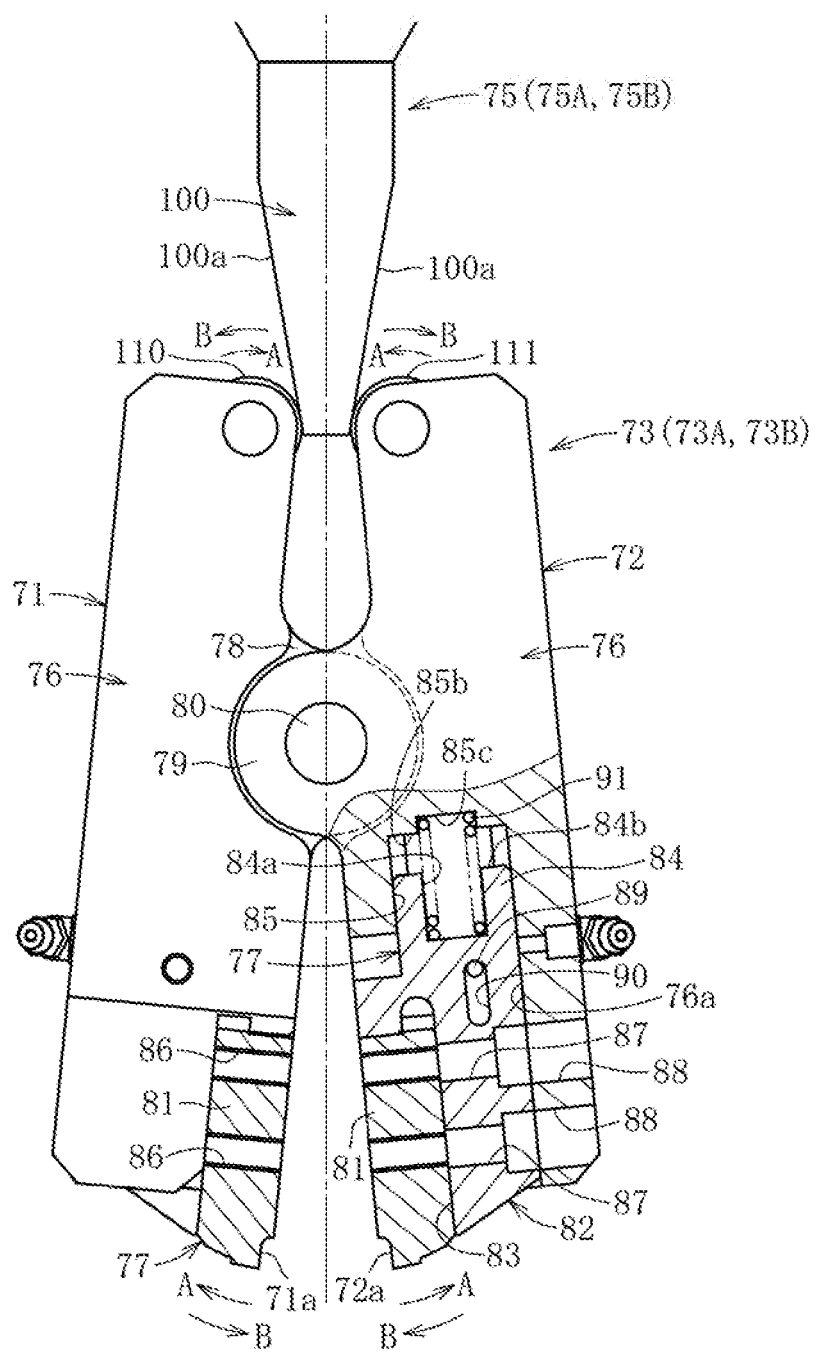
FIG. 5 is an enlarged view illustrating a partial cross section of claw members in an open state of the clamping hand attachment apparatus illustrated in FIG. 1.

As illustrated in FIG. 3, guide rollers 110, 111 are provided on base end sides of the claw members 71, 72. That is, as illustrated in FIG. 5, in a state where the front end engagement portions 71a (72a) are expanded, front ends of the tapered surfaces 100a, 100b of the wedge member 100 are clamped by the guide rollers 110, 111. For this reason, it is preferable that the claw members 71, 72 apply an elastic biasing force for swinging in directions of arrows A about the pivotal supporting shaft 80.

If the wedge member 100 is lowered as illustrated in FIG. 8 from the state-illustrated in FIG. 5, the wedge member 100 enters a gap on the base end sides of the claw members 71, 72. As a result, the claw members 71, 72 swing such that the front end engagement portions 71a, 72a of the claw members 71, 72 swing in the directions of arrows B about the pivotal supporting shaft 80 against the elastic biasing force which causes the claw members 71, 72 to swing in the directions of arrows A.

Figure 6:
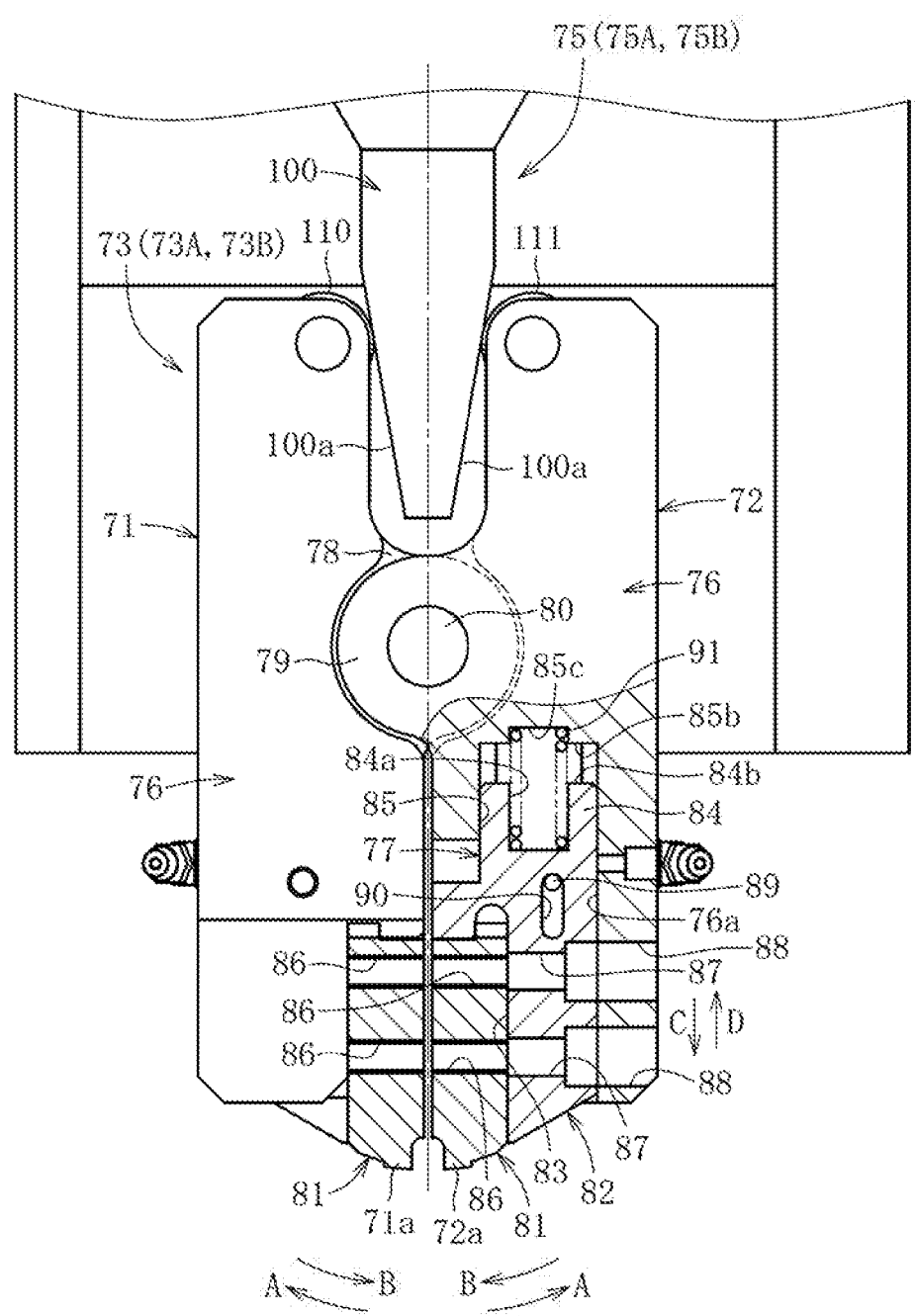
FIG. 6 is an enlarged view illustrating a partial cross section of the claw members in a closed state of the clamping band attachment apparatus illustrated in FIG. 1.
Figure 7:
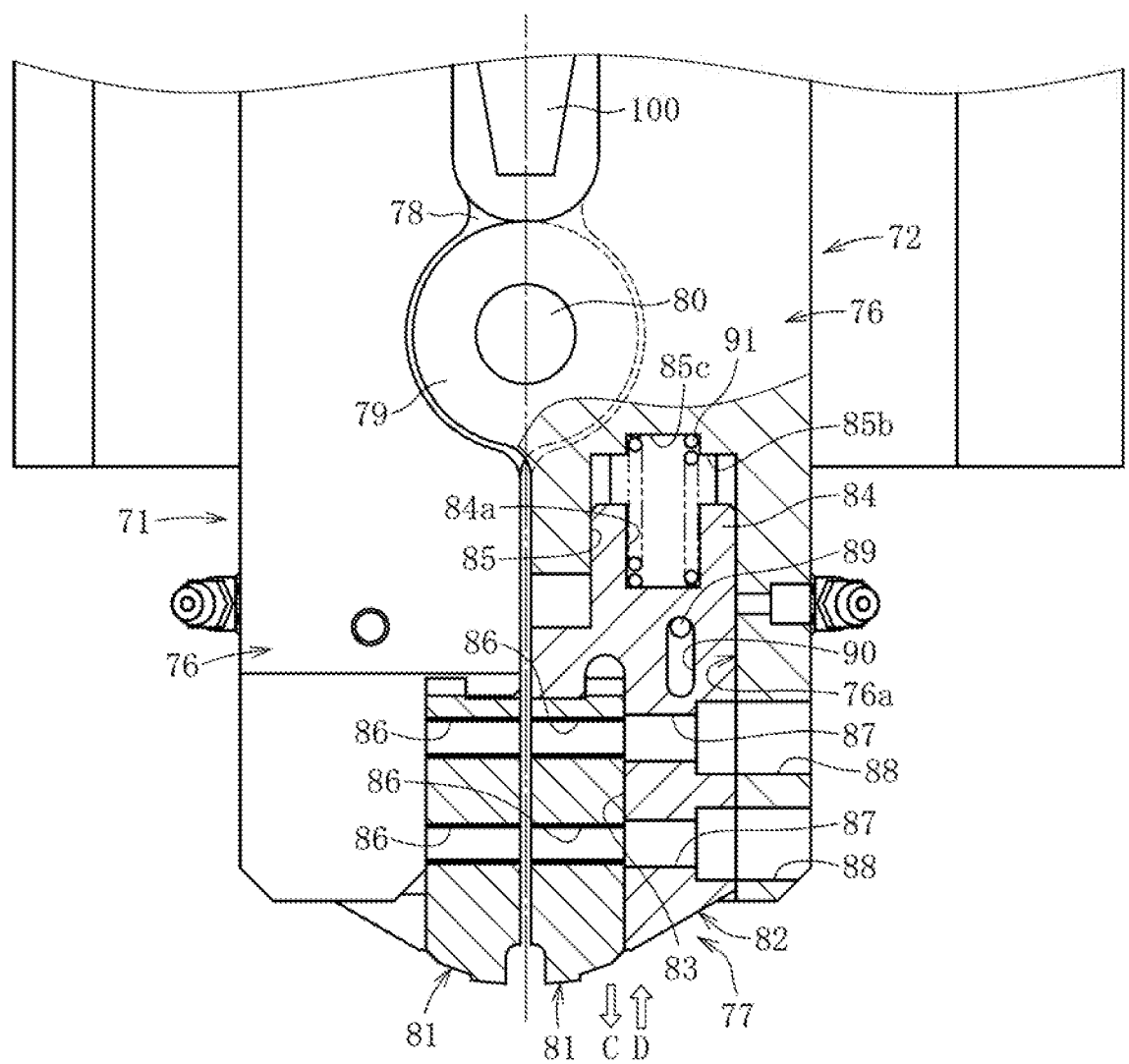
FIG. 7 is an enlarged view illustrating a free state of a sliding body of the clamping band attachment apparatus illustrated in FIG. 1.

When an external force against the elastic force of the elastic member acts on the sliding body 77 in the direction of arrow D from the state illustrated in FIG. 6, that is, the free state, the sliding body 77 slides in the direction of arrow D as illustrated in FIG. 8 (FIG. 8 illustrates a state where only a claw member 72 side slides for the sake of explanation). That is, the sliding body 77 moves backward from the state illustrated in FIG. 6. In addition, when the pressing force caused by the external force is released, the sliding body 77 slides in the direction of arrow C due to the elastic force of the elastic member 91 and returns to the state illustrated in FIG. 6, that is, the free state.

As illustrated in FIGS. 1 and 2, the clamping band, attachment apparatus includes a base 200, a workpiece placement stage 201 provided on the base 200, and a pillar member 202 erected on the base 200.

The pillar member 202 is configured of a pair of struts 203, 203, and a support frame body 204 transversely stretched. The reciprocating means 74 (74A, 74B) are attached to the support frame body 204 via a horizontal slide mechanism 205. The horizontal slide mechanism 205 includes a screw shaft 208 disposed along the horizontal direction, and a nut member 207 screwed to the screw shaft 208. Frame bodies 208, 208 of the reciprocating means 74 (74A, 74B) are attached to the nut member 207. In addition, a guide mechanism 209 is provided between the support frame body 204 and the frame bodies 208, 208. The guide mechanism 209 has a pair of guide rails 210, 210 disposed on the support frame body 204 along the horizontal direction, and sliders 211, 211 provided on the frame bodies 208, 208. The sliders 211, 211 are slidably fitted in the guide rails 210, 210. Therefore, when the screw shaft 206 is rotated about the axis thereof by driving a driving motor, not illustrated, the nut member 207 reciprocates in the horizontal direction. As a result, the frame bodies 208, 208 reciprocate in the horizontal direction.

The reciprocating means 74 includes a driving motor (servomotor) 121 erected on a horizontal supporting plate member 120 of the frame body 208, a screw shaft 122 connected to an output shaft of the driving motor 121 and disposed along the vertical direction, and a nut portion 123 screwed to the screw shaft 122. In this case, the vertically sliding frame body 105 of the swinging means 75 is provided on the nut portion 123.

Therefore, when the driving motor 121 of the reciprocating means 74 is driven, the screw shaft 122 rotates about the axis thereof, and the vertically sliding frame body 105 to which the nut portion 123 is attached moves vertically. A guide mechanism 125 is provided between the vertically sliding frame body 105 and the frame body 208. The guide mechanism 125 includes a guide rail 126 disposed on the frame body 208 along the perpendicular direction (vertical direction), and a slider 127 provided in the vertically sliding frame body 105. The slider 127 is slidably fitted in the guide rail 126. Therefore, the vertically sliding frame body 105 is guided by the guide mechanism 125 and moves vertically.

The workpiece placement stage 201 is provided with a pair of workpiece receivers 220a, 220b. The workpiece receivers 220a, 220b are provided on horizontal sliding bases 222a, 222b that are slidable on guide rails 221, 221 provided on the workpiece placement stage 201. That is, sliders 224, 224 that slide on the guide rails 221, 221 are attached to the horizontal sliding bases 222a, 222b. Each of the workpiece receivers 220a, 220b is provided with a band receiver 223a far receiving the fastening band 50 attached to the large-diameter portion 45a of the boot 45, and a band receiver 223b for receiving the fastening band 50 attached to the small-diameter portion 45b of the boot 45.

The workpiece placement stage 201 can be vertically moved by a cylinder mechanism 225 attached to the base 200. That is, a cylinder main body 225a of the cylinder mechanism 225 is suspended and fixed from the base 200, and a piston rod 225b of the cylinder mechanism 225 is connected to the workpiece placement stage 201. A pair of guide rods 228, 226 is erected on the base 200, and the guide rods 226, 226 penetrate the workpiece placement stage 201.

Therefore, the workpiece placement stage 201 is guided by the guide rods 226, 226 and is vertically moved stably by driving of the cylinder mechanism 225. By sliding the workpiece receivers 220a, 220b on the guide rail 221, it is possible to make the workpiece receivers 220a, 220b fit the size of a workpiece.

Figure 4:
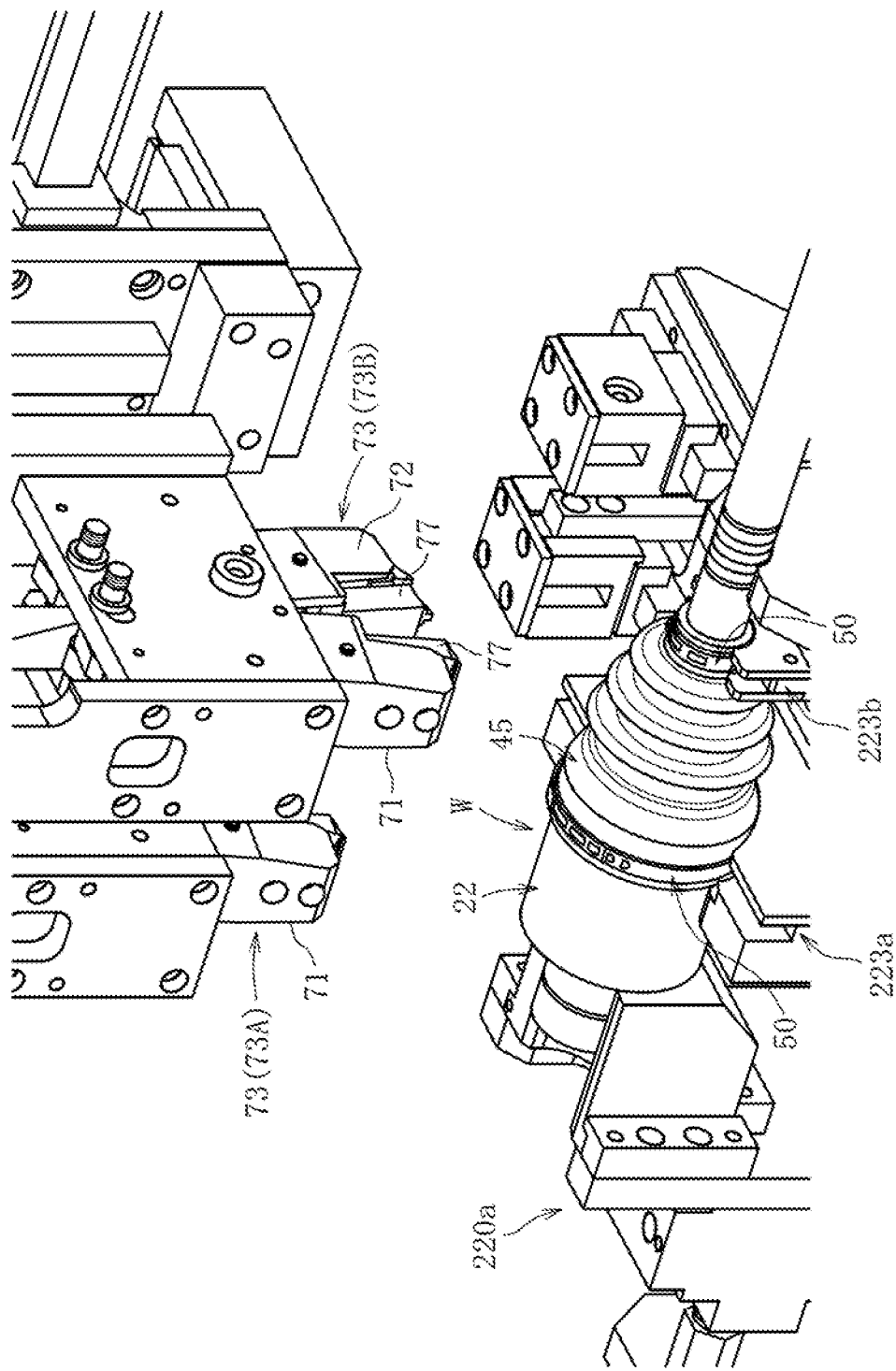
FIG. 4 is a perspective view of a main part of the clamping hand attachment apparatus illustrated in FIG. 1.

Next, a band attachment method using the clamping band attachment apparatus configured as described above will be described. First, as illustrated in FIG. 1, the drive shaft which is a workpiece W is set in the workpiece receivers 220a, 220b of the workpiece placement stage 201. In this case, the positions of the workpiece receivers 220a, 220b are aligned in the fixed-type constant velocity universal joint 21 and the sliding-type constant velocity universal joint 22 (see FIG. 16) such that the fastening band 50 of the band mounting portion 45a (see FIG. 16) of the boot 45 is received by the band receiver 228a and the fastening band 50 of the band mounting portion 45b of the boot 45 is received by the band receiver 228b, as illustrated in FIG. 4.

Figure 15A:
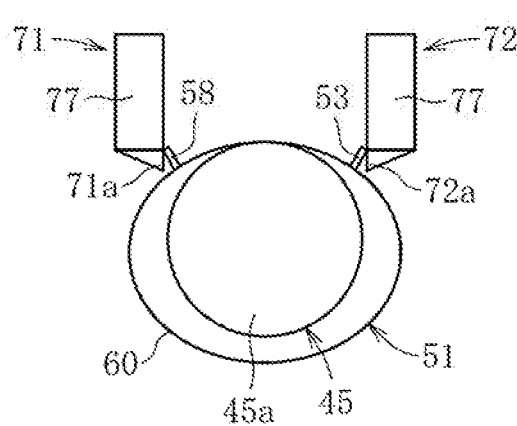
FIG. 15A is a simplified view illustrating a method of mounting the fastening band, before clamping.
Figure 16:
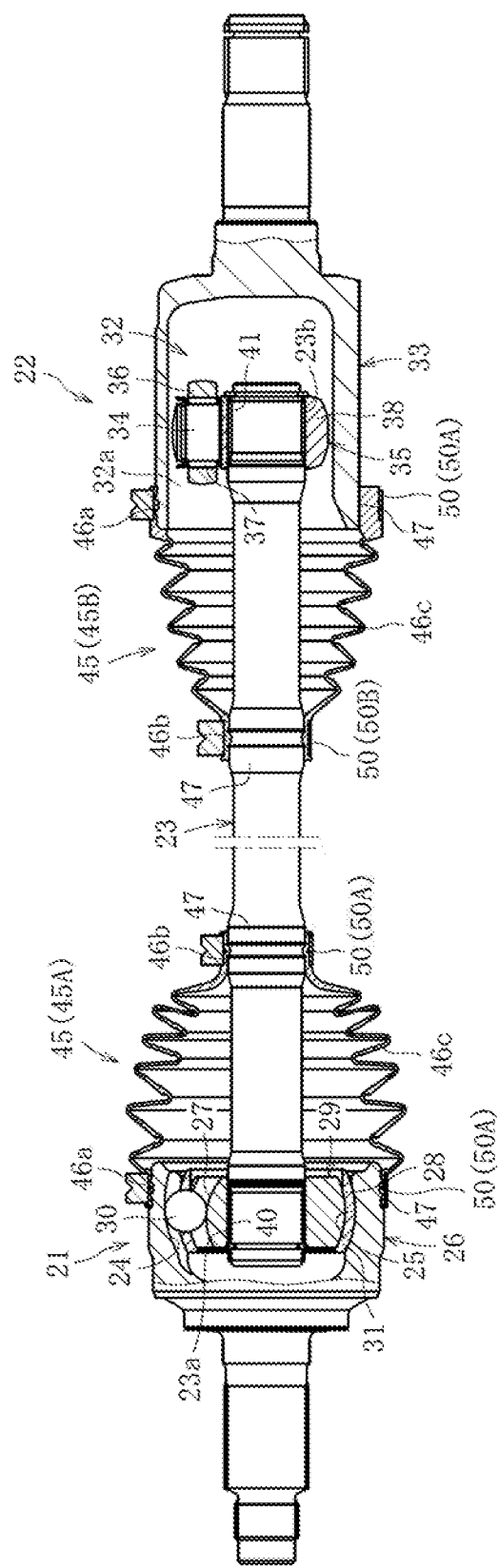
FIG. 16 is a cross-sectional view of a drive shaft.
Figure 17:
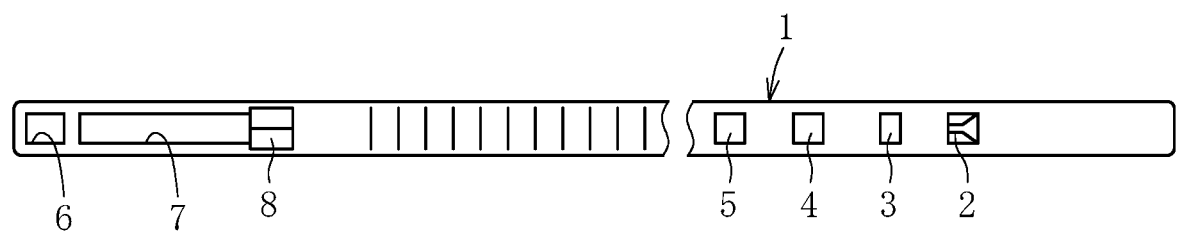
FIG. 17 is a plan view of a conventional fastening band.
Figure 18C:
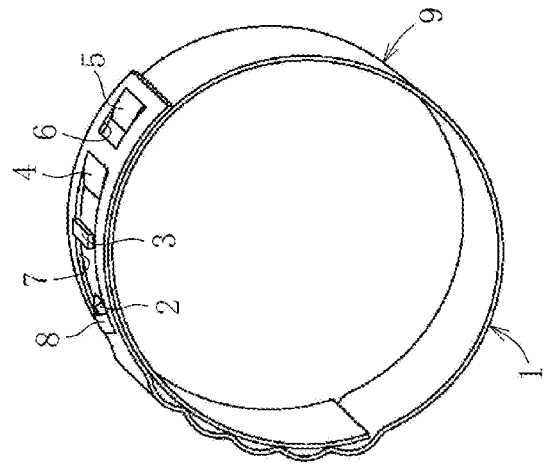
FIG. 18C is a simplified perspective view illustrating the conventional method of mounting the fastening band, after clamping.
Figure 18B:
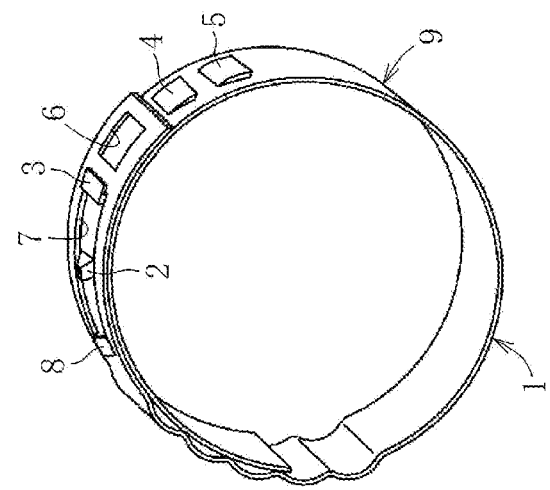
FIG. 18B is a simplified perspective view illustrating the conventional method of mounting the fastening band, in the middle of clamping.
Figure 18A:
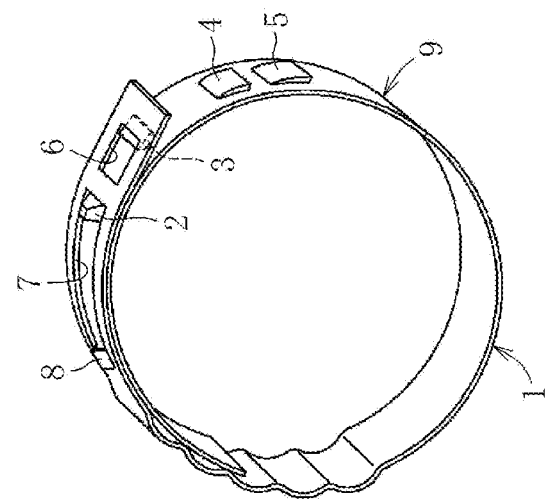
FIG. 18A is a simplified, perspective view illustrating a conventional method of mounting the fastening band, before clamping.
Figure 19A:
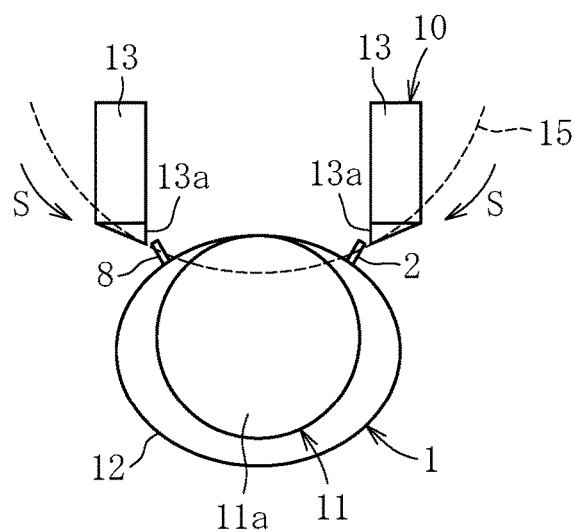
FIG. 19A is a simplified view illustrating the conventional method of mounting the fastening band, before clamping.
Figure 19B:
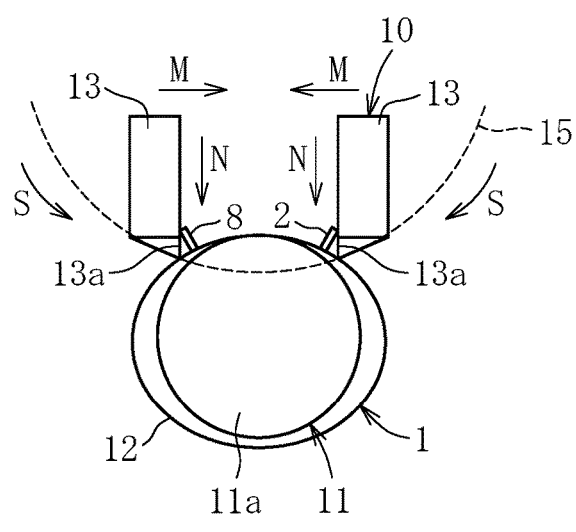
FIG. 19B is a simplified view illustrating the conventional method of mounting the fastening band, after clamping.

At this time, as illustrated in FIG. 15A, the fastening band 50 is brought into the diameter-reduced initial state where the protrusion portion 53 on the one end side is fitted into the elongated hole 56 from the inner side and the protrusion portion 53 is positioned closer to the engaging hole 57 in the elongated hole 50. Then, the pair of clamping means 73A, 73B is positioned above the fastening bands 50. At this time, as illustrated in FIG. 3, each of the claw members 71, 72 is in a state where the front end engagement portions 71a (72a) are expanded.

In this state, the claw members 71, 72 are lowered and brought closer to the band mounting portion 46a (48b) of the boot 45, that is, the fastening band 50, via the reciprocating means 74. As illustrated in FIGS. 9A, 9B, 10A, and 10B, the protrusion portions 53, 58 to be brought into close each other are sandwiched by the front end engagement portions 71a (72a). Next, the wedge member 100 is lowered so that the front end engagement portions 71a (72a) of the claw members 71, 72 are brought close to each other as illustrated in FIG. 11.

Figure 11:
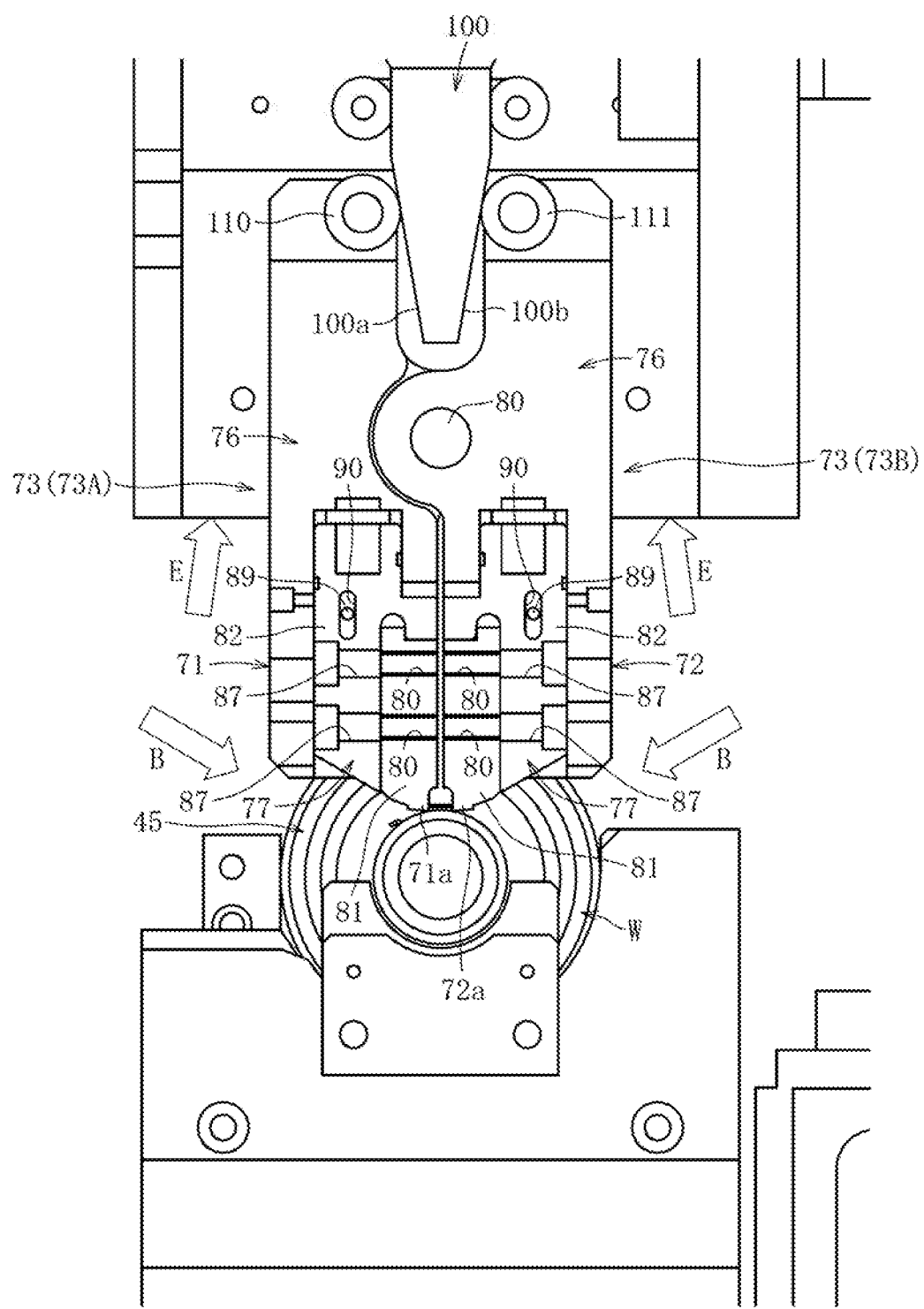
FIG. 11 is a side view of a state where caulking is performed with the claw members.
Figure 15B:
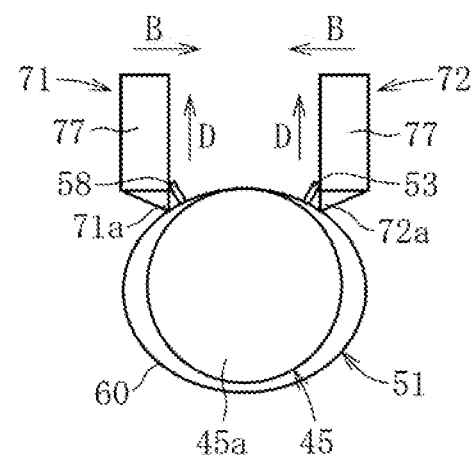
FIG. 15B is a simplified view illustrating the method of mounting the fastening band, after clamping.

That is, if the front end engagement portions 71a (72a) of the claw members 71, 72 are brought close to each other from the state where the protrusion portions 53, 58 are sandwiched by the front end engagement portions 71a (72a) as illustrated in FIG. 15A, a load in a direction of arrow E is applied to the fastening band 50 as illustrated in FIG. 11. That is, by bringing the front end engagement portions 71a (72a) close to each other as indicated by arrows B as illustrated in FIG. 15B, the claw members 71, 72 receive an upward pressing force.

However, since each of the claw members 71, 72 includes the sliding body 77 formed with the front end engagement portion 71a (72a), the sliding body 77 can escape as illustrated in FIG. 8. Therefore, as illustrated in FIG. 11, the above-described load can be canceled. That is, by having such a sliding body 77, the front end engagement portion 71a (72a) can draw a locus along the outer circumference of the band, and automatic band caulking can be performed even for a small-diameter workpiece. At this time, as described above, the engaging piece 55b is engaged with the engaging hole 57 and the engaging piece 55a is engaged with the elongated hole 58 (see FIG. 12). That is, the pair of engaging pieces 55a, 55b clamps a partition portion 81 between the elongated hole 56 and the engaging hole 57. As a result, this diameter-reduced state can be maintained.

According to the present invention, the claw members 71, 72 can approach and separate from the band mounting portions 45a, 45b of the boot 43 via the reciprocating means 74. In addition, the claw members 71, 72 can be swung in the direction approaching and separating from each other via the swinging means 75. Therefore, it is possible to bring the pair of claw members 71, 72 into the open state where the pair of claw members 71, 72 are separated from each other, and to bring the pair of claw members 71, 72 close to the band mounting portions 45a, 45b. Then, the pair of protrusion portions 58, 58 can be clamped by the front end engagement portions 71a, 72a of the pair of claw members 71, 72. In this state, if the claw members 71, 72 are brought close to each other, the diameter of the ring portion 60 can be reduced. At this time, the protrusion portions are displaced in the radial and circumferential directions, accompanying the diameter reduction, of the ring portion 60. However, it is possible for the sliding body 77 having the front end engagement portion 71a, 72a to slide so as to follow the displacements of the ring portion 60.

The sliding body 77 is attached to the claw member main body 78 via the elastic member 91 that elastically presses the sliding body 77 toward the front end side to bring the sliding body 77 in a forward state in the free state, and allows the sliding body 77 to move backward upon contact with the ring portion 60, or the protrusion portion 53 or 58 thereof in a state where the front end engagement portions 71a, 72a are brought close to each other. With such a configuration, followability of the front end engagement portions 71a, 72a with respect to the radial and circumferential displacement of the protrusion portions 53, 58 is stabilized.

The swinging means 75 includes the wedge member 100 which expands and reduces the interval between the front end engagement portions 71a, 72a of the pair of claw members 71, 72 by reciprocating in the axial direction between the pair of claw members 71, 72 on the rear end side with respect to the pivotal supporting shaft 80. With this configuration, by inserting the wedge member 100 between the pair of claw members 71, 72 on the rear end side, it is possible to bring about a closed state where the interval between the front end engagement portions 71a, 72a is reduced. By pulling out the wedge member 100 from between the pair of claw members 71, 72 on the rear end side, it is possible to bring about the open state where the interval between the front end engagement portions 71a, 72a is increased.

As described above, in the present invention, it is possible to reduce the diameter of the ring portion without using a control mechanism or the like and without performing manual work by a worker for the radial and circumferential displacement of the protrusion portions 53, 58, and to stably mount the boot 45 on the boot mounting portions 45a, 45b. Therefore, work efficiency can be improved and cost can be reduced.

In addition, by setting the sliding bodies 77, 77 of the pair of claw members 71, 72 so as to slide independently, it is possible to flexibly follow the outer diameter of the ring portion 80 without being affected by variation in the shape of the ring portion 60. It is possible to stably reduce the diameter of the ring portion 60 without forming the ring portion 80 formed by rolling the belt-shaped member 51 in a ring shape with high accuracy.

Although the embodiment of the present invention, has been described above, the present invention is not limited to the above-described embodiment, and various modifications are possible. For example, the apparatus illustrated in the embodiment includes the pair of clamping means 73A, 73B, the pair of reciprocating means 74A, 74B, and the pair of swinging means 75A, 75B, and can perform simultaneous caulking operations of the fastening bands 50 on the large-diameter side and the small-diameter side. However, there may be time difference between caulking operations. The number of each of the above means may be one, and caulking operation of one of the bands 50 on the large-diameter side and the small-diameter side may be performed and then caulking operation of the other band may be performed.

Figure 9A:
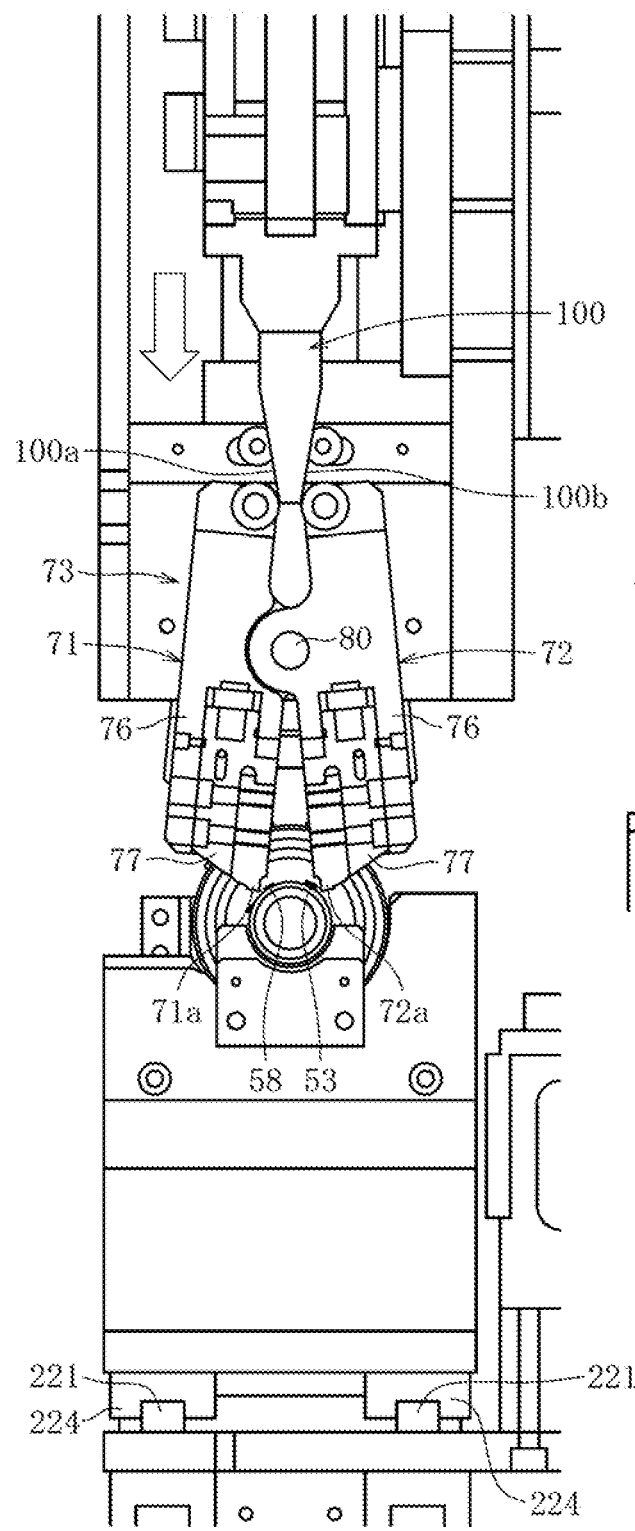
FIG. 9A is a side view illustrating a state where the claw members in the open state are lowered and illustrating a relationship between a wedge member and the claw members.
Figure 9B:
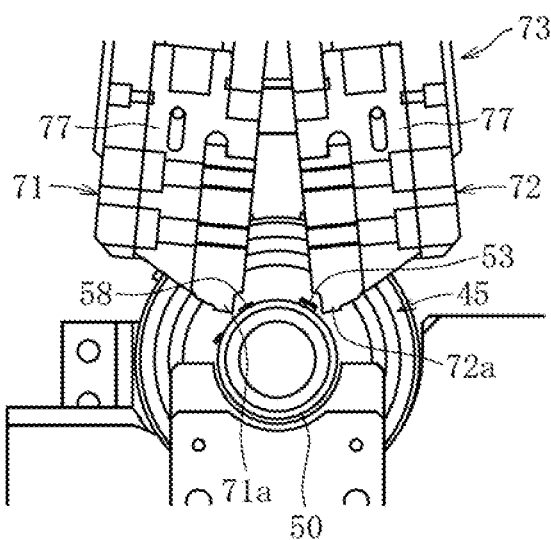
FIG. 9B is an enlarged view of a main part of FIG. 9A.
Figure 10B:
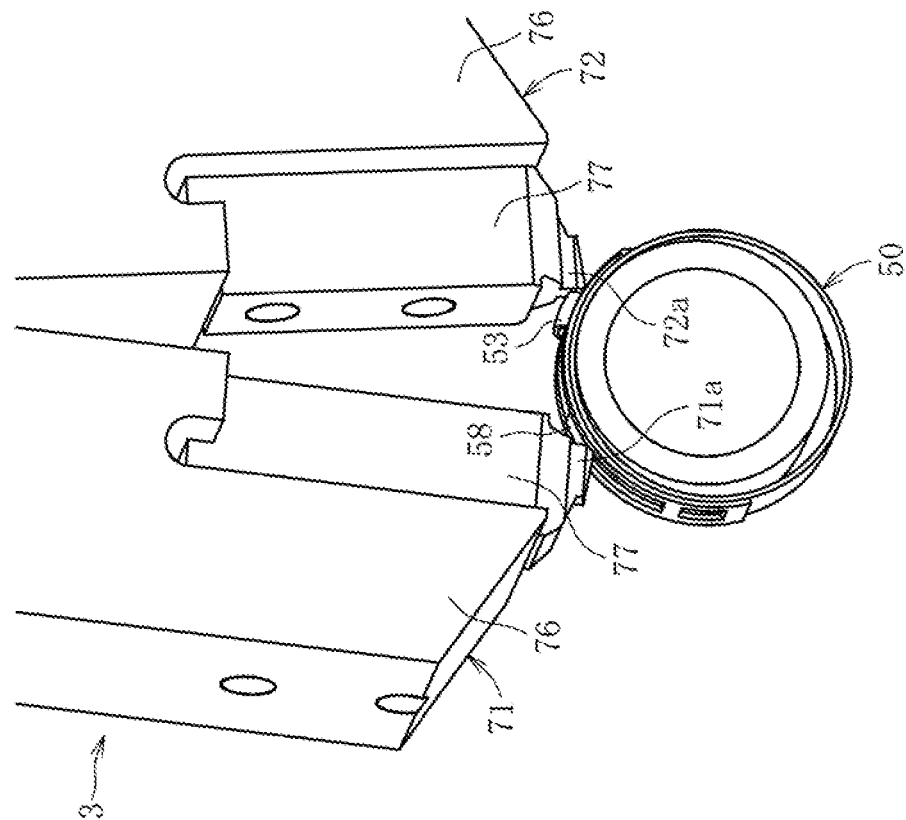
FIG. 10B is an enlarged perspective view of a main part of FIG. 10A.
Figure 10A:
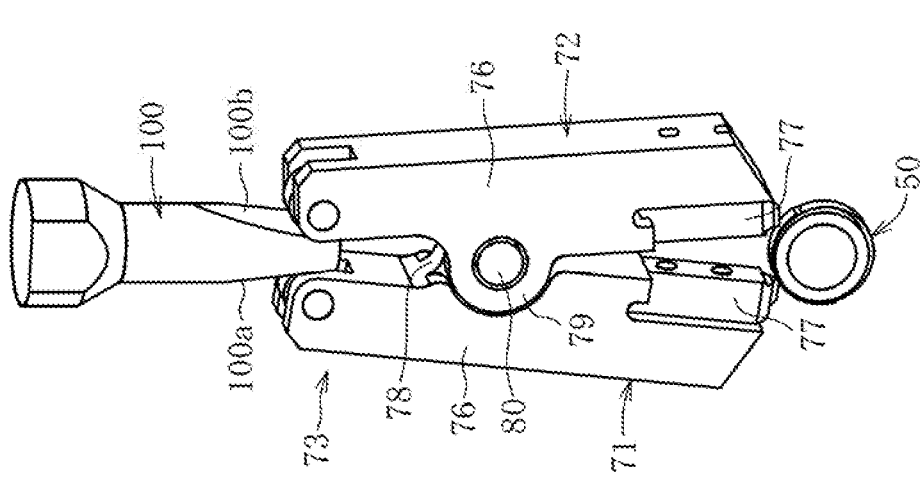
FIG. 10A is a perspective view illustrating the state where the claw members in the open state are lowered and illustrating the relationship between the wedge member and the claw members.

In the wedge member 100, the inclination angles of the tapered surfaces 100a, 100b may be variously changed as long as the claw members 71, 72 are in the open state as illustrated in FIGS. 9A, 9B and 10, and the claw members 71, 72 are in the closed state as illustrated in FIG. 11. In addition. In the above-described embodiment, the wedge member 100 is tapered downward; however, the wedge member 100 may increase in width (widen) downward. In this case, the wedge member 100 may be set such that when the claw members 71, 72 are in the open state as illustrated in FIG. 9, the wedge member 100 is brought into a state of entering (being fitted in) the gap on the base end sides of the claw members 71, 72, and by moving backward the wedge member 100 in a direction separating from the gap from this state, the claw members 71, 72 are brought into the closed state.

INDUSTRIAL APPLICABILITY

The boot to be used may be a resin boot or a rubber boot. In addition, the fixed-type constant velocity universal joint of the drive shaft as the workpiece W may be a Birfield-type or an undercut free-type joint. The sliding type constant velocity universal joint may be a double offset-type, a tripod-type, or a cross groove-type joint or the like.

REFERENCE SIGNS LIST 45 (45A, 45B): Boot
46a: Band mounting portion (Large-diameter portion)
46b: Band mounting portion (Small diameter portion)
51: Belt-shaped member
53, 58: Protrusion portion
60: Ring portion
71, 72: Claw member
71a, 72a: Front end engagement portion
73 (73A, 73B): Clamping means
74 (74A, 74B): Reciprocating means
75 (75A, 75B): Swinging means
76: Claw member main body
77: Sliding body
80: Pivotal supporting shaft
91: Elastic member
100: Wedge member

The invention claimed is:

1. A band attachment method comprising:
rounding a belt-shaped member in a ring shape and forming a ring portion which is externally fitted to a band mounting portion of a boot, the ring portion being formed with a pair of protrusion portions separated at a predetermined pitch along a circumferential direction; and
bringing the pair of protrusion portions close to each other in the circumferential direction near front end engagement portions of a pair of claw members that swing about a pivotal supporting shaft so as to reduce a diameter of the ring portion,
wherein in a state where the pair of protrusion portions of the ring portion are clamped by the front end engagement portions of the pair of claw members, sliding bodies slide with contact of the front end engagement portions to one of the ring portion and the pair of protrusion portions of the ring portion so as to follow a radial and circumferential displacement of the pair of protrusion portions accompanying a diameter reduction of the ring portion while the front end engagement portions of the pair of claw members are swung in a direction approaching each other about a pivotal supporting portion, by which the front end engagement portions of the pair of claw members draw a locus along an outer circumference of a band to reduce the diameter of the ring portion.

2. The band attachment method according to claim 1, wherein each of the sliding bodies of the pair of claw members is independently slidable.

3. A clamping band attachment apparatus for rounding a belt-shaped member in a ring shape and forming a ring portion externally fitted to a band mounting portion of a boot, the ring portion being formed with a pair of protrusion portions separated at a predetermined pitch along a circumferential direction, and for bringing the pair of protrusion portions close to each other in the circumferential direction so as to reduce a diameter of the ring portion, the clamping band attachment apparatus comprising:
clamping means which has a pair of claw members configured to swing in a direction in which front end engagement portions of the pair of claw members approach and separate from each other about a pivotal supporting portion;
reciprocating means configured to reciprocate the pair of claw members of the clamping means in a direction approaching and separating from the band mounting portion of the boot; and
swinging means configured to swing the pair of claw members of the clamping means in a direction approaching and separating from each other, wherein each of the pair of claw members includes a claw member main body and a sliding body formed with each of the front end engagement portions, and
wherein in a state where the pair of protrusion portions of the ring portion are clamped by the front end engagement portions of the pair of claw members, the sliding body formed with each of the front end engagement portions is slidably attached to the claw member main body so as to follow a radial and circumferential displacement of each of the pair of protrusion portions accompanying a diameter reduction of the ring portion while the front end engagement portions of the pair of claw members are swung in the direction approaching each other about the pivotal supporting portion by which the front end engagement portions of the pair of claw members draw a locus along an outer circumference of a band to reduce the diameter of the ring portion.

4. The clamping band attachment apparatus according to claim 3, wherein each of the sliding bodies is attached to a respective one of the claw member main bodies via an elastic member configured to bias the sliding body toward a front end side to bring the sliding body in a forward state the sliding bodies being configured to move backward upon contact with one of the ring portion and the pair of protrusion portions of the ring portion in a state where the front end engagement portions are brought close to each other.

5. The clamping band attachment apparatus according to claim 3, wherein the swinging means includes a wedge member configured to expand and reduce an interval between the front end engagement portions of the pair of claw members when reciprocated in an axial direction between the pair of claw members on a rear end side with respect to the pivotal supporting portion.

6. The clamping band attachment apparatus according to claim 4, wherein the swinging means includes a wedge member configured to expand and reduce an interval between the front end engagement portions of the pair of claw members when reciprocated in an axial direction between the pair of claw members on a rear end side with respect to the pivotal supporting portion.

7. The band attachment method according to claim 1, wherein the sliding bodies are configured to slide linearly.

8. The clamping band attachment apparatus according to claim 3, wherein the sliding bodies are configured to slide linearly.

* * * * *